United States Patent Office 3,407,257
Patented Oct. 22, 1968

3,407,257
COMBATTING HERPES SIMPLEX VIRUSES WITH 4' - [2 - NITRO - 1 - (PARATOLYLTHIO)ETHYL] ACETANILIDE
Darwin A. Buthala, Kalamazoo, Mich., and Gerald E. Underwood, Berkeley, Calif., assignors to The Upjohn Company, Kalamazoo, Mich., a corporation of Delaware
No Drawing. Filed Nov. 23, 1965, Ser. No. 509,428
6 Claims. (Cl. 424—324)

This invention relates to pharmaceutical preparations, more particularly topical pharmaceutical preparations and their use.

The preparations of the instant invention are advantageously useful in topical pharmaceutical applications for they demonstrate unexpected activity as shown by their effectiveness in combatting viral skin lesions of herpes simplex virus. The process of the instant invention is advantageously useful for it demonstrates unexpected pharmaceutical actiivty in inhibiting herpes simplex virus.

In accordance with the present invention there are provided topical pharmaceutical preparations consisting essentially of a major amount of a pharmaceutical carrier for topical application and as essential active ingredient 4'-[2-nitro-1-(p-tolylthio)ethyl]acetanilide. Also provided is a process which combats herpes simplex skin lesions by topically applying to skin hosting said lesions a sufficient amount of 4'-[2-nitro-1-(p-tolylthio)ethyl]acetanilide for lesion control, preferably as essential active ingredient in association with a major amount of a topical pharmaceutical carrier.

In the preparation of the essential active ingredient of this invention, 4-acetamido-$\beta$-nitrostyrene is prepared by reacting 4-acetamidobenzaldehyde with nitromethane in methanol in the presence of sodium hydroxide. Schales et al., J.A.C.S. 74:4487 (1952). Thereafter, 124 gm. of the 4-acetamido-$\beta$-nitrostyrene is reacted with 74.6 gm. of 4-methylthiophenol in 3 l. of absolute ethanol using 12 ml. of triethylamine as catalyst. A white precipitate is obtained. Recrystallization from absolute ethanol yields about 125 gm. of purified 4'-[2-nitro-1-(p-tolylthio)ethyl] acetanilide melting at 161–164° C.

"A pharmaceutical carrier for topical application," otherwise "topical pharmaceutical carrier," means lotion vehicles, ointment bases, cream bases, hydrogel paste, fatty paste, aqueous solutions, preferably isotonic, aqueous suspending vehicles, micronized solid diluents, propellant-containing liquid vehicles adapted to form an aerosol, and the like, these being used in methods known to the art in compounding lotions, ointments, creams, pastes, and the other enumerated dosage forms for topical application.

The percentage by weight of the essential active ingredient herein utilized ranges from about 0.1% to about 10% of the pharmaceutical preparation, preferably from about 1% to about 5%, and in these preparations the aforesaid pharmaceutical carrier for topical application constitutes a major amount of the said preparation. In such preparations the essential active ingredient is preferably micronized, so that 99% of particles are under 25 microns and 75% are under 10 microns. A useful secondary ingredient in said preparations is a nontoxic antibacterial agent, preferably a topically effective antibiotic such as neomycin, polymyxin and bacitracin, added to control or prevent any secondary bacterial infection.

The following examples describe the manner and process of making and using the invention and set forth the best mode contemplated by the inventors of carrying out the invention but are not to be construed as limiting.

Example 1.—Ointment for topical application

A sterile ointment was compounded of wool fat, liquid petrolatum, white petrolatum, 2% by weight of 4'-[2-nitro-1-(p-tolylthio)ethyl]acetanilide and 0.5% of neomycin sulfate as anti-bacterial agent to prevent secondary infection.

Four rabbits weighing 250–350 gm. were depilated and inoculated with $5 \times 10^6$ plaque-forming units of herpes simplex virus by abrading the skin with a virus-saturated cotton swab. Topical application of the above ointment to the skin hosting the virus was started 2.5 hours after virus inoculation and was repeated hourly during the day. As controls, four additional rabbits were similarly inoculated and treated with a similar ointment not containing the acetanilide compound. Daily observations were made for uniform flaccid paralysis of the hind legs and death.

| Days after virus inoculation | Ointment, 2% | | Control | |
|---|---|---|---|---|
| | Paralysis | Dead | Paralysis | Dead |
| 3 | 0/4 | 0/4 | 0/4 | 0/4 |
| 4 | 0 | 0 | 0 | 0 |
| 5 | 0 | 0 | 1 | 0 |
| 6 | 0 | 0 | 3 | 1 |
| 7 | 0 | 0 | 1 | 3 |
| 8 | 0 | 0 | 1 | 3 |
| 9 | 0 | 0 | 0 | 4 |
| 10 | 0 | 0 | | |
| 11 | 0 | 0 | | |
| 12 | 0 | 0 | | |
| 14 | 0 | 0 | | |

These results indicate that the ointment gave complete protection against the inoculated virus.

Example 2.—Ointment for topical application

An ointment was compounded with 5% by weight of 4'-[2-nitro-1-(p-tolylthio)ethyl]acetanilide, and 0.5% by weight of neomycin sulfate to control any secondary bacterial infection.

Herpes virus infection was induced on the depilated back of mature rabbits by abrading the skin. Cutaneous treatment with the ointment was started immediately and continued every hour during the day for five consecutive days. A control group of rabbits was treated with a similar ointment not containing the acetanilide compound. In the table below, arbitrary values are assigned to the severity of the lesion in order to calculate a daily mean lesion score.

| Day | Control | | Treated | |
|---|---|---|---|---|
| | Number rabbits scored | Mean lesion score | Number rabbits scored | Mean lesion score |
| 1 | 12 | 0.02 | 13 | 0.008 |
| 2 | 15 | 0.48 | 15 | 0.21 |
| 3 | 15 | 1.02 | 16 | 0.43 |
| 4 | 13 | 1.73 | 14 | 0.80 |
| 5 | 15 | 2.35 | 16 | 1.08 |
| 6 | 16 | 2.50 | 17 | 1.54 |
| 7 | 15 | 2.63 | 16 | 1.72 |
| 8 | 17 | 2.69 | 18 | 1.78 |
| 9 | 8 | 2.63 | 8 | 1.49 |
| 10 | 6 | 2.13 | 6 | 1.09 |
| 11 | 11 | 2.17 | 12 | 1.62 |
| 13 | 11 | 1.68 | 11 | 1.19 |

The data from these experiments show that from Day 2 to Day 10, inclusive, the treated mean lesion score is significantly less than the control average, the severity of the herpes skin lesion being greatly lessened.

Example 3.—Topical ointment

A topical ointment was compounded as in Example 2. Adult rabbits were depilated and inoculated with herpes simplex virus; approximately $5 \times 10^6$ plaque-forming units of virus was inoculated by abrading the skin with a virus-saturated cotton swab. Topical treatment with the ointment was started 2.5 hours after virus inoculation and repeated hourly during the day. At the indicated times post-inoculation the lesions were harvested and their virus contents were determined in rabbit kidney cell cultures.

| Treatment | Days post inoculation | Virus titer (log₁₀ PFU)* |
|---|---|---|
| Medicated ointment | 3 | 4.2 |
|  |  | 4.1 |
|  |  | 4.6 |
|  |  | 4.7 |
| Control ointment | 3 | 6.2 |
|  |  | 6.4 |
|  |  | 6.4 |
|  |  | 6.2 |

*Plaque-forming units.

The data in the above table show that the herpes virus titers were lowered by the topical application.

The foregoing data demonstrate, inter alia, the affinity of herpes simplex virus for susceptible host cells. In the uninhibited controls a virus:susceptible cell relationship obtains wherein the virus attaches or adsorbs to the cell; the susceptible host cell in a manner of speaking being a substrate for the virus such that interaction of the virus and the virus-susceptible host cell occurs. There apparently ensues penetration of the cell by the virus and proliferation therein to such an extent that mature developed virus upon release becomes a source of infectiousness for other cells and spread of the viral infection. In the untreated controls paralysis, skin lesions and high titers of virus occur. However, when the affinity of the herpes simplex virus for the virus-susceptible host cell and their interaction are subjected to the inhibiting effect of the compositions containing 4'-[2-nitro-1-(p-tolylthio)ethyl]acetanilide, in some manner protection against the virus is achieved, severity of the skin lesion is greatly lessened, and titers of the herpes virus are lowered. Viral proliferation and development are effectively inhibited. The aforesaid affinity for, and associated effects on, susceptible host cells are also exemplified by lysis of susceptible host cells and formation of plaques when cell monolayers are subjected to herpes simplex virus and interaction is allowed to proceed without interruption or inhibition of viral development.

Example 4.—Aqueous preparation

Host cells susceptible to the herpes simplex virus were obtained in a known manner by trypsining kidneys from baby rabbits. 2.5×10⁶ rabbit kidney cells were suspended in 5 ml. of nutrient medium composed of Hank's balanced salt solution, Proc. Soc. Exptl. Biol. and Med., 71:196 (1949), plus 10% calf serum, with glutamine and vitamins as in Eagle, Science 122:501–504 (1955). The cell suspension was placed in a 60 mm. plastic Petri dish and allowed to deposit a monolayer during 5 days at 37° C. in a humidified atmosphere of 5% $CO_2$ in air. After removal of the medium, the resulting monolayer contained 4×10⁶ rabbit kidney cells.

A stock dispersion of herpes simplex virus in Eagle's medium plus 10% calf serum, containing 6.7×10⁶ plaque-forming units per 0.5 ml. was serially diluted to provide a titer of 670 plaque-forming units per 0.5 ml. 0.5 ml. of this virus dispersion was added to each monolayer of rabbit kidney cells. After one hour there was added 4 ml. of maintenance agar medium (1%) containing 5% calf serum and supplemented glutamine, amino acids and vitamins as in Eagle. After solidification of the agar layer, wells were cut therein and bottom-sealed with agar.

A sterile aqueous solution was prepared to contain 1% sodium carboxymethyl cellulose of low viscosity, 0.4% polysorbate 80 U.S.P., 0.04% propylparaben and q.s. water for injection. This solution was mixed with sterile saline solution in the proportion of 1 part aqueous solution to 7 parts saline solution. 4'-[2-nitro-1-(p-tolylthio)ethyl]acetanilide was dissolved in the aforesaid mixed solution to provide an aqueous preparation having a concentration of 0.25% w./v. of this essential active ingredient. 0.02 ml. of this solution was added to each sealed-off well. After three days a zone of protected cells due to the antiviral effects of the aqueous preparation of the essential active ingredient was observed; an effective amount of the acetanilide compound for inhibition having been used. Controls do not show such zones for the unrestrained viral development results in lysis of the cells and plaque formation.

What is claimed is:

1. A pharmaceutical preparation for topical application consisting essentially of a major amount of a pharmaceutical carrier for topical application and as essential active ingredient from about 0.1% to about 10% by weight of 4'-[2-nitro-1-(p-tolylthio)ethyl]acetanilide.

2. A process of combating skin lesions of herpes simplex which comprises applying to skin hosting said lesions an effective amount of 4' - [2-nitro-1-(p-tolylthio)ethyl]acetanilide for lesion control.

3. An antiviral method which comprises subjecting the interaction of herpes simplex virus and a virus-susceptible host cell to a sufficient amount of 4'-[2-nitro-1-(p-tolylthio)ethyl]acetanilide for inhibition of said interaction.

4. The antiviral method of claim 3 which comprises subjecting herpes simplex virus otherwise proliferating in susceptible host cells to a sufficient amount of 4'-[2-nitro-1-(p-tolylthio)ethyl]acetanilide for inhibition of proliferation of said virus.

5. The antiviral method of claim 3 which comprises subjecting herpes simplex virus otherwise proliferating in susceptible host cells to a sufficient amount of 4'-[2-nitro-1-(p-tolylthio)ethyl]acetanilide for inhibition of infectiousness of said virus.

6. The antiviral method of claim 3 which comprises subjecting herpes simplex virus otherwise proliferating in susceptible host cells to a sufficient amount of 4'-[2-nitro-1-(p-tolylthio)ethyl]acetanilide for reduction of titer of said virus.

No references cited.

RICHARD L. HUFF, *Primary Examiner.*